UNITED STATES PATENT OFFICE.

JOHN MATTHEWS, JR., OF NEW YORK, N. Y.

IMPROVEMENT IN SODA-FOUNTAINS.

Specification forming part of Letters Patent No. 42,587, dated May 3, 1864.

*To all whom it may concern:*

Be it known that I, JOHN MATTHEWS, Jr., of the city, county, and State of New York, have invented certain new and useful Improvements in Soda-Water Fountains; and I do hereby declare that the following is a full, clear, and exact description of the same.

In the construction and use of soda-water fountains some serious objections arise to the employment of each of the different materials of which these have been made, and hitherto those objections have been found insurmountable. The favorite material was, for a long time, copper, and, as this would be injurious to health, it was coated on the inside with tin. That coating, however, could not be kept so entirely unbroken as to prevent the liquid from acting on the copper in places, and it also imparted a taint to the soda water. The best fountains, as regards the purity of the liquid, have been made of cast-iron coated on the inside with porcelain or similar vitreous matter in the form of an enamel, which serves the purpose of protecting the surface of the iron for a time from the action of the liquid. A smaller number only of any lot so made will be found available as perfect fountains—say about ten per cent.—for the reason that it is not practicable to cast in a greater proportion the iron part so entirely free from porous parts as to be gas-tight under the required pressure. The coating of enamel does not correct this, for it is full of minute cracks, invisible at first to the naked eye, but after a time becoming apparent from the discoloration caused by the oxide of iron working through. The enamel soon becomes porous and loses its gloss from the efflorescence of some of its components, in a manner well known.

I have discovered a method by which these fountains can be made air-tight, as well as of permanently closing the pores and cracks of the enamel, so that no discoloration will take place; and it consists in combining with the iron and the enamel a third substance of such character that when melted it shall be capable of saturating or permeating the pores of both the iron and the enamel, and when cold shall adhere to the sides and effectually close them, both against the escape of the gases and the action of the liquid on the iron. None of the soft metals will effect this, and I prefer to use paraffine, as being readily applied, cheap, and imparting no taint to the liquid. The process by which I combine this with the iron and enamel is to immerse the two sections of the enameled fountain in a bath of melted paraffine, which is to be kept hot—say about 200° Fahrenheit—for several hours, during which time the pores of the cast-iron and enamel become filled or saturated with the paraffine. When taken out, cooled, and the parts joined together, the fountain will be perfectly gas-tight.

I claim—

Combining with the iron and the enamel a third substance, of the character and for the purpose substantially as set forth.

JOHN MATTHEWS, JR.

Witnesses:
I. P. PIERSSON,
S. H. MAYNARD.